(12) United States Patent
Nicholson et al.

(10) Patent No.: US 12,407,251 B2
(45) Date of Patent: Sep. 2, 2025

(54) SYSTEMS AND METHODS FOR IMPROVING EFFICIENCY IN A POWER CONVERTER USING CASCODE POWER STAGES

(71) Applicant: Empower Semiconductor, Inc., San Jose, CA (US)

(72) Inventors: Richard Nicholson, Aptos, CA (US); Feng Yuan, Union City, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 222 days.

(21) Appl. No.: 18/066,914

(22) Filed: Dec. 15, 2022

(65) Prior Publication Data

US 2023/0198388 A1 Jun. 22, 2023

Related U.S. Application Data

(60) Provisional application No. 63/292,359, filed on Dec. 21, 2021.

(51) Int. Cl.
*H02M 3/155* (2006.01)

(52) U.S. Cl.
CPC .................................. *H02M 3/155* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30;

(Continued)

(56) References Cited

U.S. PATENT DOCUMENTS

| 7,196,545 B1 * | 3/2007 | Groen .................... H03K 3/356 326/46 |
| 10,103,633 B1 * | 10/2018 | Knoedgen ............. H02M 7/487 |

(Continued)

FOREIGN PATENT DOCUMENTS

| TW | 202005244 A | 1/2020 |
| WO | 20210112309 A1 | 6/2021 |

OTHER PUBLICATIONS

Office Action issued in TW113141885 application, issued Apr. 22, 2025, 10 pages.

*Primary Examiner* — Sean Kayes
*Assistant Examiner* — Nusrat Quddus
(74) *Attorney, Agent, or Firm* — FisherBroyles, LLP

(57) ABSTRACT

A circuit. In one aspect, the circuit includes a first power stage including a first switch having a first gate terminal, a first drain terminal and a first source terminal, and a second switch having a second gate terminal, a second drain terminal and a second source terminal, the first source terminal coupled to the second drain terminal, and a second power stage including a third switch having a third gate terminal, a third drain terminal and a third source terminal, and a fourth switch having a fourth gate terminal, a fourth drain terminal and a fourth source terminal, the third source terminal coupled to the fourth drain terminal, where the second power stage is coupled in parallel to the first power stage such that the first drain terminal is couped to the third drain terminal and the second source terminal is connected to the fourth source terminal.

20 Claims, 2 Drawing Sheets

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H05B 39/048; B23K 11/24; H04B 2215/069

See application file for complete search history.

(56) References Cited

U.S. PATENT DOCUMENTS

| | | | | |
|---|---|---|---|---|
| 10,673,396 | B1 * | 6/2020 | Dodge | H03F 3/1935 |
| 10,868,429 | B2 * | 12/2020 | Li | H02M 3/07 |
| 11,716,022 | B2 * | 8/2023 | Tarroboiro | H02M 3/158 |
| | | | | 323/271 |
| 2004/0077150 | A1 * | 4/2004 | Tosaka | H03K 17/693 |
| | | | | 438/313 |
| 2006/0255852 | A1 * | 11/2006 | O'Donnell | H03K 17/08142 |
| | | | | 327/437 |
| 2012/0062199 | A1 * | 3/2012 | Bahramian | H02M 1/08 |
| | | | | 323/282 |
| 2013/0141168 | A1 * | 6/2013 | Nozaki | H03F 1/0261 |
| | | | | 330/296 |
| 2014/0300422 | A1 * | 10/2014 | Okajima | H03F 1/0261 |
| | | | | 330/296 |
| 2014/0368257 | A1 * | 12/2014 | Wang | H03K 17/08104 |
| | | | | 327/434 |
| 2015/0001615 | A1 | 1/2015 | Yong et al. | |
| 2016/0056778 | A1 * | 2/2016 | Blum | H03F 1/0272 |
| | | | | 330/296 |
| 2019/0305767 | A1 * | 10/2019 | Ranta | H03K 17/0412 |
| 2020/0030402 | A1 | 1/2020 | Ataullakhanov et al. | |
| 2021/0075380 | A1 * | 3/2021 | Labanc | H01J 37/32174 |

* cited by examiner

SYSTEMS AND METHODS FOR IMPROVING EFFICIENCY IN A POWER CONVERTER USING CASCODE POWER STAGES

CROSS REFERENCE TO RELATED APPLICATIONS

This application claims priority to U.S. provisional patent application Ser. No. 63/292,359, for "Systems and Methods for Improving Efficiency in a Power Converter Using Cascode Power Stages" filed on Dec. 21, 2021, which is hereby incorporated by reference in entirety for all purposes.

FIELD

The described embodiments relate generally to power converters, and more particularly, the present embodiments relate to systems and methods for improving efficiency in power converters that use cascode power stages.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a power converter circuit is disclosed. The power converter circuit includes a first power stage including a first switch having a first gate terminal, a first drain terminal and a first source terminal, and a second switch having a second gate terminal, a second drain terminal and a second source terminal, the first source terminal coupled to the second drain terminal; a second power stage including a third switch having a third gate terminal, a third drain terminal and a third source terminal, and a fourth switch having a fourth gate terminal, a fourth drain terminal and a fourth source terminal, the third source terminal coupled to the fourth drain terminal, wherein the second power stage is coupled in parallel to the first power stage such that the first drain terminal is couped to the third drain terminal and the second source terminal is connected to the fourth source terminal; an input terminal coupled to a first terminal of an impedance element; an output terminal coupled to a second terminal of the impedance element and to the first and third drain terminals; and a control circuit arranged to couple the first gate terminal to a DC bias during a first state and to couple the first gate terminal to the first source terminal during a second state.

In some embodiments, the first and second power stages control power transfer from the input terminal to the output terminal.

In some embodiments, the first state is full load condition where the first and second power stages transfer power from the input terminal to the output terminal.

In some embodiments, the second state is light load condition where the second power stage transfers power from the input terminal to the output terminal.

In some embodiments, the control circuit is arranged to cause the second gate terminal to connect to the second source terminal during the second state.

In some embodiments, the first and second power stages are arranged to generate an output voltage at the output terminal that is lower than a voltage at the input terminal.

In some embodiments, a method of operating a power converter circuit is disclosed. The method includes providing a first power stage including a first switch having a first gate terminal, a first drain terminal and a first source terminal, and a second switch having a second gate terminal, a second drain terminal and a second source terminal, the first source terminal coupled to the second drain terminal; providing a second power stage including a third switch having a third gate terminal, a third drain terminal and a third source terminal, and a fourth switch having a fourth gate terminal, a fourth drain terminal and a fourth source terminal, the third source terminal coupled to the fourth drain terminal, wherein the second power stage is coupled in parallel to the first power stage such that the first drain terminal is couped to the third drain terminal and the second source terminal is connected to the fourth source terminal; providing an input terminal coupled to a first terminal of an impedance element; providing an output terminal coupled to a second terminal of the impedance element and to the first and third drain terminals; and coupling, using a control circuit, the first gate terminal to a DC bias during a first state and to the first source terminal during a second state.

In some embodiments, the method further includes controlling power transfer, using the first and second power stages, from the input terminal to the output terminal.

In some embodiments, the first state is full load condition where the first and second power stages transfer power from the input terminal to the output terminal.

In some embodiments, the second state is light load condition where the second power stage transfers power from the input terminal to the output terminal.

In some embodiments, the method further includes causing, using the control circuit, the second gate terminal to connect to the second source terminal during the second state In some embodiments, the method further includes generating an output voltage at the output terminal, using the first and second power stages, that is lower than a voltage at the input terminal.

In some embodiments, a circuit is disclosed. The circuit includes a first power stage including a first switch having a first gate terminal, a first drain terminal and a first source terminal, and a second switch having a second gate terminal, a second drain terminal and a second source terminal, the first source terminal coupled to the second drain terminal; a second power stage including a third switch having a third gate terminal, a third drain terminal and a third source terminal, and a fourth switch having a fourth gate terminal, a fourth drain terminal and a fourth source terminal, the third source terminal coupled to the fourth drain terminal, wherein the second power stage is coupled in parallel to the first power stage such that the first drain terminal is couped to the third drain terminal and the second source terminal is connected to the fourth source terminal; an input terminal coupled to a first terminal of a transistor; an output terminal coupled to a second terminal of the transistor and to the first and third drain terminals; and a control circuit arranged to couple the first gate terminal to a DC bias during a first state and to couple the first gate terminal to the first source terminal during a second state.

In some embodiments, the fourth gate terminal is arranged to receive a pulse width modulated (PWM) signal.

In some embodiments, in response to receiving the PWM signal, the fourth switch is arranged to control transfer of power from the input terminal to the output terminal in the second state.

DETAILED DESCRIPTION

Circuits and related techniques disclosed herein relate generally to power converters. More specifically, circuits, devices and related techniques disclosed herein relate to systems and methods for improving efficiency in power converters that use cascode power stages. In some embodiments, a power converter, such as a DC-DC converter, can include cascode connected switches where each switch may be formed from multiple segments, and where a portion of the segments may be disabled (or shed) in order to improve the efficiency of the power converter across a range of load currents. In various embodiments, disclosed methods can enable use of the shedding technique in a power converter with cascode power stages. In some embodiments, methods for shedding portions of the segments of the switches can enable a reduction of a maximum voltage applied to the switches, thereby keeping the switches within their safe operating area (SOA) and improving reliability. Various inventive embodiments are described herein, including methods, processes, systems, devices, and the like.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1:
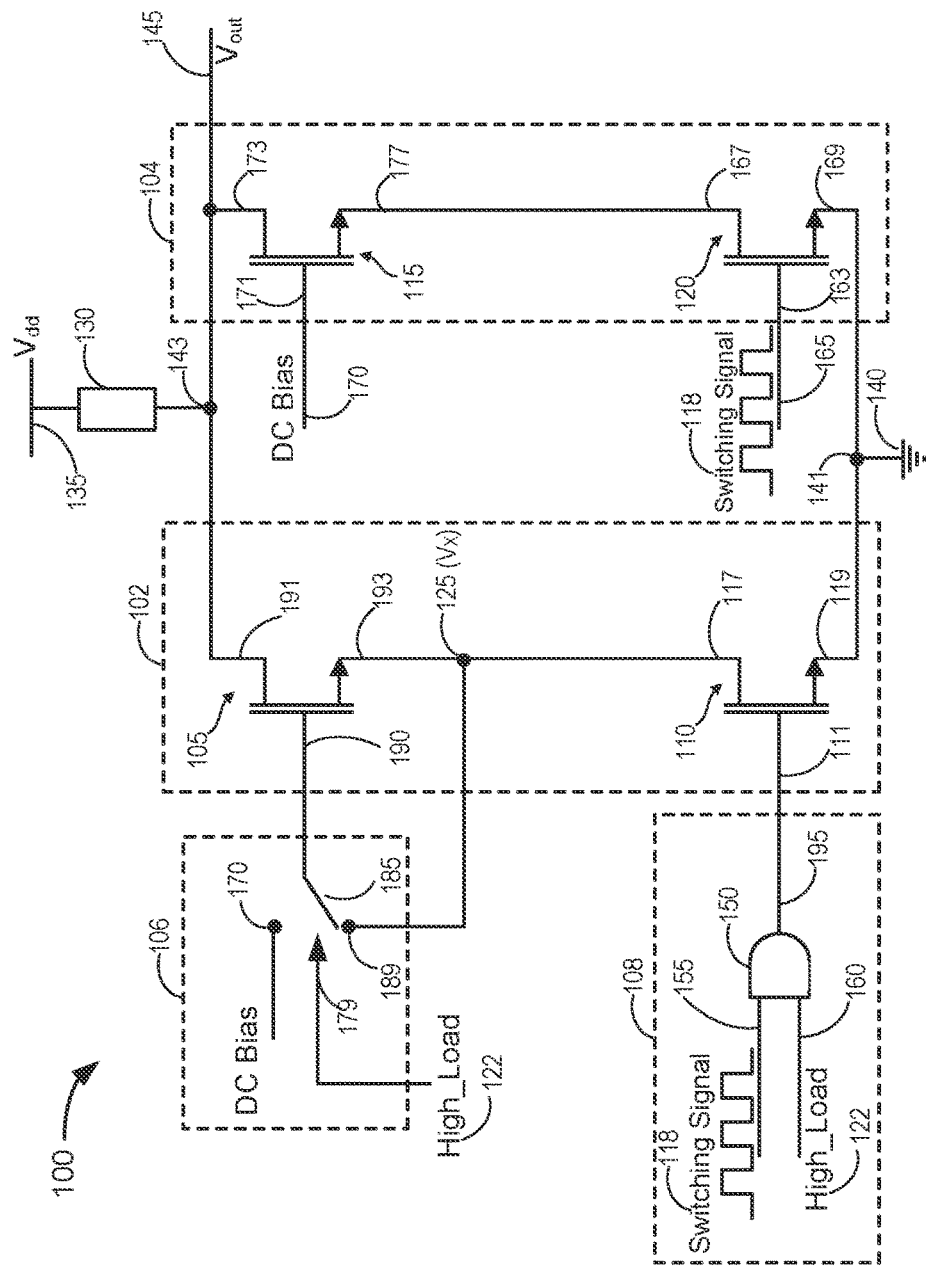
FIG. 1 illustrates a DC-DC power converter circuit using cascode power stages according to an embodiment of the disclosure.

FIG. 1 illustrates a DC-DC power converter circuit 100 that uses cascode power stages according to an embodiment of the disclosure. As shown in FIG. 1, the DC-DC power converter circuit 100 can include a first segment power stage 102 and a second segment power stage 104 that are coupled in parallel. In various embodiments, circuit 100 may include three or more parallel segments coupled in parallel. The first segment power stage 102 can be coupled to the second segment power stage 104 at a node 143 and at a node 141. Each one of the first and second segments 102, 104, respectively, can include a top switch 105 and 115, respectively, and a bottom switch 110 and 120, respectively. Top switch 105 can have a gate terminal 190, a drain terminal 191 and a source terminal 193. Top switch 115 can have a gate terminal 171, a drain terminal 173 and a source terminal 177. Bottom switch 110 can have a gate terminal 111, a drain terminal 117 and a source terminal 119. Bottom switch 120 have a gate terminal 163, a drain terminal 167 and a source terminal 169.

Top switch 105 can be coupled in a cascode configuration to the bottom switch 120. Top switch 115 can be coupled in a cascode configuration to the bottom switch 120. In some embodiments, the top switches 105 and 115 can be identical in terms of size and other electrical characteristics, and the bottom switches 110 and 120 can be identical in terms of size and other electrical characteristics. In various embodiments, the top and bottom switches may have different sizes and different electrical characteristics. The power converter circuit 100 can include an input terminal 135 and an output terminal 145. The input terminal 135 can be arranged to have a power supply $V_{dd}$. In some embodiments, output terminal 145 may be coupled to an inductor. Node 143 can be coupled to the power supply $V_{dd}$ through an impedance element 130. In some embodiments, node 143 can be coupled to the power supply $V_{dd}$ through a switch, such as, but not limited to, a metal oxide semiconductor field effect transistor (MOSFET). In various embodiments, impedance element 130 can be a resistor. Node 141 can be coupled to a ground 140. Circuit 100 can provide an output voltage ($V_{out}$) at output terminal 145. Circuit 100 can further include a first control circuit 106 that is coupled to the top switch 105 and a second control circuit 108 that is coupled to the bottom switch 110. In some embodiments, the first and second control circuits 106 and 108 may be integrated to form one control circuit. A switch 185 can be coupled to the gate terminal 190. The switch 185 can be controlled by a signal High_Load 122 and can be arranged to connect the gate terminal 190 to a node 170 or node 189. Node 170 may have a DC Bias voltage. Node 189 can be coupled to node 125 that is connected to source terminal 193.

During full load conditions of operation, the power converter circuit 100 can use both first and second segment power stages 102 and 104 to generate power at the output terminal 145. Full load condition may also be referred to as high load condition. During light load conditions of operation, the power converter circuit 100 can shed (or disable) one of the first and second segment power stages 102 and 104 in order to improve efficiency, since during light load conditions majority of power losses are due to the switching losses of the switches 105, 110, 115 and 120. When a segment is shed during light load conditions of operation, the switching losses may be reduced, thereby improving the efficiency of the power converter 100. In the first segment power stage 102, top switch 105 and bottom switch 110 may be coupled in a cascode configuration. In this way, the top switch 105 and the bottom switch 110, can be coupled in series such that each switch supports part of the power supply voltage across its drain terminal to source terminal. The sum of the voltages across the drain to source terminals may be more than any one switch can withstand, i.e., the sum of the voltages across the drain to source terminals may be outside the safe operating area (SOA) of each switch. Prolonged operation outside the SOA may cause reliability issues and damage to the switch. Similarly, in the second segment power stage 104, top switch 115 and bottom switch 120 are arranged in a cascode configuration such that each switch supports part of the power supply voltage across its drain terminal to source terminal.

Switch 185 can be controlled by a High_Load signal 122. High_Load signal 122 can be in a high state when the power converter is operating in the high load condition, and in a low state when the power converter is operating in a light load condition. In the high load condition of operation, the gate terminal 190 can be connected to node 170 and have a DC Bias voltage. The gate terminal 171 can be connected to the node 170 and have a DC Bias voltage. Thus, both gates terminals of the top switches can be connected to the DC bias voltage. A gate of the bottom switch 110 can be connected to an output node of an AND gate 150, where a first input node 155 of the AND gate 150 can be arranged to receive a switching signal 118 and a second input node 160 of the AND gate 150 can be arranged to receive the signal High_Load 122. In some embodiments, the switching signal 118 can be a pulse width modulated (PWM) signal.

During the high load condition, the signal High_Load 122 can be in a high state. Therefore, the AND gate 150 may pass through the switching signal 118 to the gate terminal 111. Thus, during the high load condition the bottom switch 110 can be switching. A gate terminal 163 may also be coupled to terminal 165 that is arranged to receive Switching Signal 118, thus bottom switch 120 can also be switching during the high load condition. Therefore, both bottom switches 110 and 120 may be switching during high load condition. In this way, the effective on-resistance (Rdson) of the bottom switches can be minimized because both bottom switches 110 and 120 are arranged in parallel. Further, a maximum voltage across each power stage segment can be divided between its top switch and its bottom switch, i.e., each of the switches 105/110 and 115/120 may not experience a voltage beyond their rated safe operating area (SOA).

During a light load condition of operation, the first power stage segment 102 may be shed (disabled) in order to improve the efficiency of the power converter. During the light load condition, High_Load signal 122 is in a low state, therefore switching signal 118 cannot go through the AND gate 150. With High_Load signal 122 in a low state, the switch 185 can disconnect the gate terminal 190 from the node 170 and can connect the gate terminal 190 to the node 125 that is coupled to the source terminal 193. Therefore, the first power stage segment 102 can be disabled, while segment 104 can continue to function. By connecting the gate terminal 190 to the node 125, the gate terminal 190 is connected to a high impedance node. The voltage Vx at the node 125 can be determined by a relative magnitude of the drain-to-source leakage currents of the top switch 105 and the bottom switch 110. For example, if the drain-to-source leakage current of top switch 105 is greater than the drain-to-source leakage current of bottom switch 110, voltage at the node 125 may increase towards the power supply $V_{dd}$. When the voltage at node 125 increases, it causes a reduction of the drain-to-source voltage of the top switch 105 that results in a reduction of the drain-to-source leakage current of top switch 105. At the same time the drain-to-source voltage of the bottom switch 110 is increased resulting in bottom switch 110 leakage current to be increased. Therefore, the voltage (Vx) at node 125 decreases and moves towards the midpoint through this feedback loop until an equilibrium is achieved. In this way, the equilibrium voltage at node 125 (Vx) may be at a voltage that is lower than the gate-to-drain breakdown voltage of top switch 105 and of the bottom switch 110.

Figure 2:
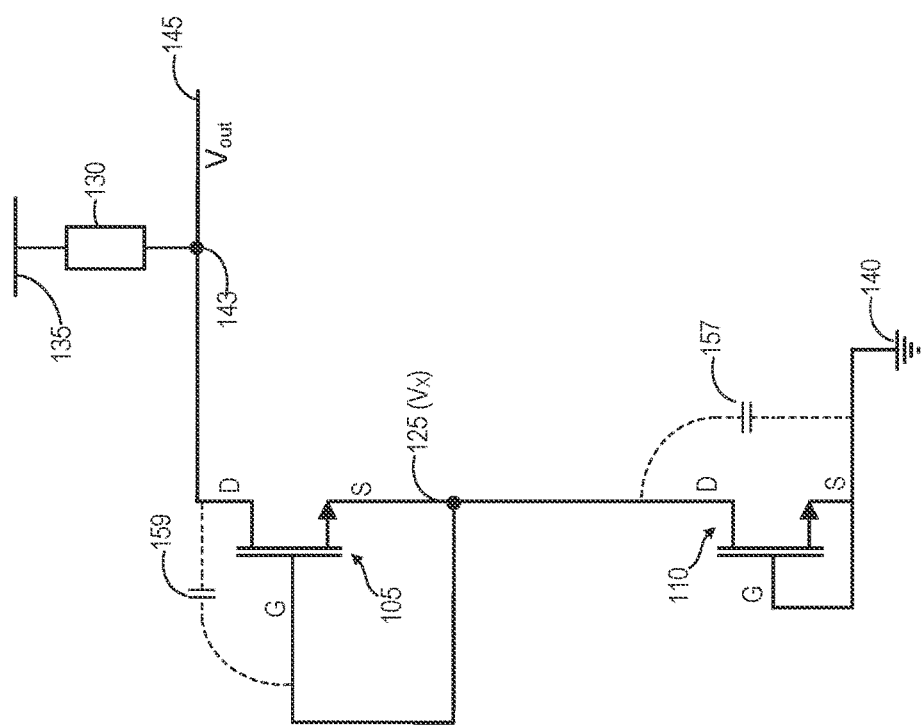
FIG. 2 illustrates an equivalent circuit for a segment of the circuit of FIG. 1, showing parasitic capacitances during a light load condition of operation according to certain embodiments.

During the light load condition, the top switch 105 can be turned off because its gate terminal is connected to its source. FIG. 2 illustrates an equivalent circuit for the first power stage segment 102, showing parasitic capacitances during the light load condition. As can be seen in FIG. 2, during light load condition the gate terminal 190 can be coupled to node 125, and gate terminal 111 of the bottom switch 110 can be connected to its source at ground 140. Since there is no channel formed in the top switch 105, a drain-to-gate parasitic capacitance 159 of top switch 105 can be relatively small. In this way, parasitic capacitance at the output terminal 145 can be minimized resulting in an improved efficiency of the power converter circuit 100. This is because the parasitic capacitance on the output terminal 145 can have a significant effect on efficiency of the power converter circuit 100 since the output terminal 145 is charged and discharged as $V_{out}$ swings from rail-to-rail. The parasitic capacitance at the output terminal 145 is charged and discharged as $V_{out}$ swings from rail-rail with the energy stored in the parasitic capcitance at the output terminal 145 being dissipated as heat, directly impacting efficiency. Furthermore, the output voltage $V_{out}$ at output terminal 145 may swing repeatedly from Vdd to ground, and where the switches are implemented as MOSFET devices, as $V_{out}$ goes to ground, node Vx may be clamped to a voltage of ground-$V_{diode}$ ($V_{diode}$ being the voltage across a parasitic diode between a drain and a substrate of a MOSFET, where the substrate is connected to source). A value of $V_{diode}$ may be, for example, 0.7 V. Thus, a voltage $V_{diode}$ is maintained across the top switch 105 gate-source parasitic capacitance. As $V_{out}$ swings to Vdd, $V_x$ can move towards the equilibrium point and the voltage across the top switch 105 gate-source capacitance becomes $V_{dd}$-$V_x$. Therefore, on each switching cycle the voltage change on the top switch 105 gate-source capacitance is $V_{dd}$-$V_x$-$V_{diode}$.

As discussed above, in some embodiments, during light load conditions, the gate terminal of top switch 105 is connected to its source. This prevents a channel being formed in the top switch 105 and enables a parasitic capacitance of top switch 105 to be relatively small in order to improve efficiency of the power converter 100. Further, a drain-to-source parasitic capacitance 157 of bottom switch 110 is in series with the draib-to-gate parasitic capacitance 159 of top switch 105, resulting in an overall smaller parasitic capacitance for the combined parasitic capacitances of top switch 105 and bottom switch 110. In this way, the parasitic capacitance at the output terminal 145 can be minimized.

Embodiments of the present disclosure can also reduce power supply leakage current, resulting in improvement of the efficiency of the power converter. For example, when the bottom switch 110 is off, the power converter's leakage current can be limited to a maximum leakage current that is possible through the combination of top switch 105 and bottom switch 110. In some embodiments, top switch 105 can be implemented having a relatively small size, thereby relatively lower leakage current can flow through the top switch 105, therefore limiting the leakage current that can flow from the power supply $V_{dd}$ to ground 140.

As appreciated by one of skill in the art having the benefit of this disclosure, the gate of the top switch 105 can be connected to its source by, for example, a switching element, such as a MOSFET, a resistor, a diode, or a diode-connected MOSFET or other active circuits such as an amplifier or a follower circuit. In various embodiments, the DC bias voltage can be generated such that it is higher than the ground voltage, but not so high that the top switch 105 can turn on under any circumstance, and not so low that the gate-to-drain breakdown voltage of the top switch 105 is exceeded.

Although the primary applications of the disclosed techniques have been shown herein as employed in power stages, the disclosed techniques are applicable to any cascode device that is to be turned off with minimum leakage, or is to be turned off in a way such that the parasitic capacitance on the drain node of its switch is to be minimized. Further, different sizes of switches can be dynamically used in order to change the gain of the power stage, the slew speed of the power stage, or to allow a low current standby mode.

In some embodiments, the described switches can be formed in silicon, or any other semiconductor material. In various embodiments, the described switches can be transistors. In certain embodiments, the described switches can be metal oxide semiconductor field effect transistors (MOSFETs). In some embodiments, the MOSFETs can all be formed within one single die. In some embodiments, the disclosed power converter can be monolithically integrated onto a single die. In various embodiments, top switches and bottom switches may be formed on separate individual die. In some embodiments, top switches and bottom switches and the logic and control circuits and any combination of them can be formed in groups on separate die. In various embodiments, top switches and bottom switches, and the logic and control circuits can all be integrated into one electronic package, such as, but not limited to, a quad-flat no-lead (QFN) package, a dual-flat no-leads (DFN) package, or a ball grid array (BGA) package.

Although systems and methods for improving efficiency in power converters that use cascode power stages are described and illustrated herein with respect to one particular configuration of DC-DC power converter circuits, embodiments of the disclosure are suitable for use with other configurations of power converters. For example, multi-phase DC-DC power converter circuits can employ embodiments of the disclosure to shed (disable) a segment of a power stage in order to operate more efficiently.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A power converter circuit comprising:
a first power stage including a first switch having a first gate terminal, a first drain terminal and a first source terminal, and a second switch having a second gate terminal, a second drain terminal and a second source terminal, the first source terminal directly coupled without having any other intervening elements in between to the second drain terminal;
a second power stage including a third switch having a third gate terminal, a third drain terminal and a third source terminal, and a fourth switch having a fourth gate terminal, a fourth drain terminal and a fourth source terminal, the third source terminal directly coupled to the fourth drain terminal, wherein the second power stage is coupled in parallel to the first power stage such that the first drain terminal is coupled to the third drain terminal and the second source terminal is connected to the fourth source terminal;
an input terminal coupled to a first terminal of an impedance element;

an output terminal coupled to a second terminal of the impedance element and to the first and third drain terminals; and a control circuit arranged to couple the first gate terminal to a DC bias during a first state and to couple the first gate terminal to the first source terminal during a second state.

2. The power converter circuit of claim 1, wherein the first and second power stages control power transfer from the input terminal to the output terminal.

3. The power converter circuit of claim 1, wherein the first state is full load condition where the first and second power stages transfer power from the input terminal to the output terminal.

4. The power converter circuit of claim 1, wherein the second state is light load condition where the second power stage transfers power from the input terminal to the output terminal.

5. The power converter circuit of claim 1, wherein the control circuit is arranged to cause the second gate terminal to connect to the second source terminal during the second state.

6. The power converter circuit of claim 1, wherein the first and second power stages are arranged to generate an output voltage at the output terminal that is lower than a voltage at the input terminal.

7. A method of operating a power converter circuit, the method including:

providing a first power stage including a first switch having a first gate terminal, a first drain terminal and a first source terminal, and a second switch having a second gate terminal, a second drain terminal and a second source terminal, the first source terminal directly coupled without having any other intervening elements in between to the second drain terminal;

providing a second power stage including a third switch having a third gate terminal, a third drain terminal and a third source terminal, and a fourth switch having a fourth gate terminal, a fourth drain terminal and a fourth source terminal, the third source terminal directly coupled to the fourth drain terminal, wherein the second power stage is coupled in parallel to the first power stage such that the first drain terminal is coupled to the third drain terminal and the second source terminal is connected to the fourth source terminal;

providing an input terminal coupled to a first terminal of an impedance element;

providing an output terminal coupled to a second terminal of the impedance element and to the first and third drain terminals; and coupling, using a control circuit, the first gate terminal to a DC bias during a first state and to the first source terminal during a second state.

8. The method of claim 7, further comprising controlling power transfer, using the first and second power stages, from the input terminal to the output terminal.

9. The method of claim 7, wherein the first state is full load condition where the first and second power stages transfer power from the input terminal to the output terminal.

10. The method of claim 7, wherein the second state is light load condition where the second power stage transfers power from the input terminal to the output terminal.

11. The method of claim 7, further comprising causing, using the control circuit, the second gate terminal to connect to the second source terminal during the second state.

12. The method of claim 7, further comprising generating an output voltage at the output terminal, using the first and second power stages, that is lower than a voltage at the input terminal.

13. A circuit comprising:

a first power stage including a first switch having a first gate terminal, a first drain terminal and a first source terminal, and a second switch having a second gate terminal, a second drain terminal and a second source terminal, the first source terminal directly coupled without having any other intervening elements in between to the second drain terminal;

a second power stage including a third switch having a third gate terminal, a third drain terminal and a third source terminal, and a fourth switch having a fourth gate terminal, a fourth drain terminal and a fourth source terminal, the third source terminal directly coupled to the fourth drain terminal, wherein the second power stage is coupled in parallel to the first power stage such that the first drain terminal is coupled to the third drain terminal and the second source terminal is connected to the fourth source terminal;

an input terminal coupled to a first terminal of a transistor;

an output terminal coupled to a second terminal of the transistor and to the first and third drain terminals; and a control circuit arranged to couple the first gate terminal to a DC bias during a first state and to couple the first gate terminal to the first source terminal during a second state.

14. The circuit of claim 13, wherein the first and second power stages control power transfer from the input terminal to the output terminal.

15. The circuit of claim 13, wherein the first state is full load condition where the first and second power stages transfer power from the input terminal to the output terminal.

16. The circuit of claim 13, wherein the second state is light load condition where the second power stage transfers power from the input terminal to the output terminal.

17. The circuit of claim 13, wherein the control circuit is arranged to cause the second gate terminal to connect to the second source terminal during the second state.

18. The circuit of claim 13, wherein the first and second power stages are arranged to generate an output voltage at the output terminal that is lower than a voltage at the input terminal.

19. The circuit of claim 13, wherein the fourth gate terminal is arranged to receive a pulse width modulated (PWM) signal.

20. The circuit of claim 19, wherein in response to receiving the PWM signal, the fourth switch is arranged to control transfer of power from the input terminal to the output terminal in the second state.

* * * * *